Figure 5:
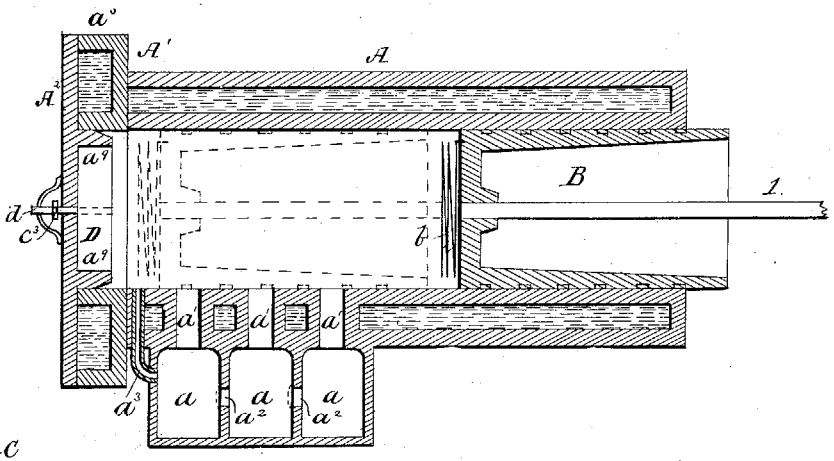

2 Sheets—Sheet 1.
L. C. PARKER.
GAS ENGINE.
No. 10,290. Reissued Feb. 20, 1883.
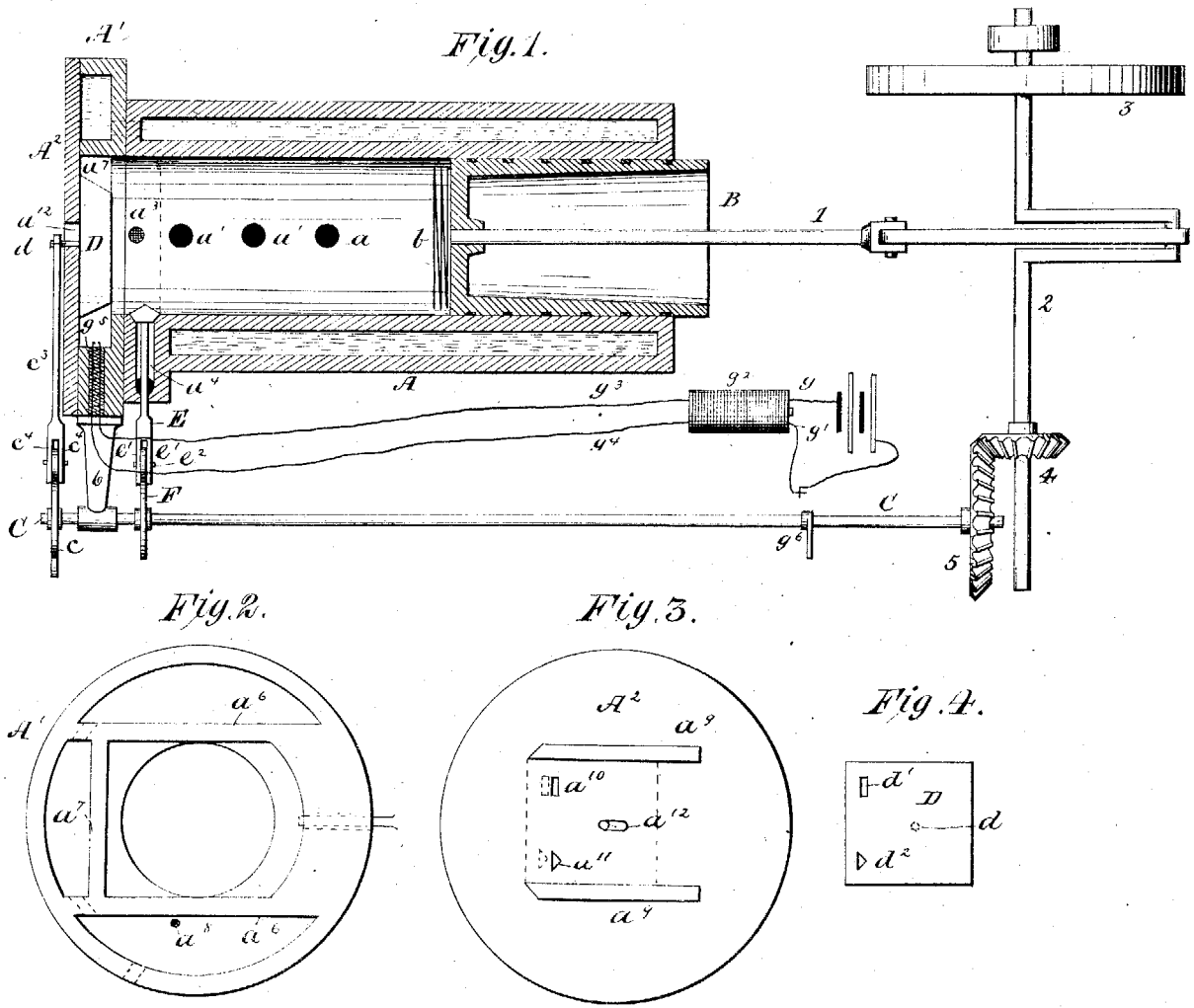
Witnesses.
A. J. Osgood
P. Printz
Inventor
Lewis C. Parker
by Howard A. Snow
Atty 2 Sheets—Sheet 2.

L. C. PARKER.

GAS ENGINE.

No. 10,290. Reissued Feb. 20, 1883.

Witnesses.
W. J. Osgood
P. Printz

Inventor
Lewis C. Parker.
by Howard A. Snow
att'y.

UNITED STATES PATENT OFFICE.

LEWIS C. PARKER, OF ROBINSON, KANSAS.

GAS-ENGINE.

SPECIFICATION forming part of Reissued Letters Patent No. 10,290, dated February 20, 1883.

Original No. 269,213, dated December 26, 1882. Application for reissue filed January 18, 1883.

*To all whom it may concern:*

Be it known that I, LEWIS C. PARKER, of Robinson, in the county of Brown and State of Kansas, have invented certain new and useful Improvements in Gas-Engines; and I hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates to that class of gas-engines wherein a pressure produced within a cylinder by the combustion of an inflammable mixture of air and gas causes a piston to make its stroke.

In most gas-engines of present construction the entire combustible charge is exploded at one ignition, which results in a sudden development of heat and pressure, a great portion of which is expended by absorption and impact against the cylinder-walls while the piston is near the dead-center point of the engine crank shaft.

One of the principal objects aimed at in my engine is to produce a series of explosions behind the piston, whereby the expansive force of each explosion is maintained during the power-stroke, thus obtaining greater economy of force from the same amount of combustible mixture exploded in the ordinary manner; and, further, in ordinarily constructed gas-engines the admission-valves are held against the valve-seats by a pressure strong enough to resist the explosive force of the mixture, and are given a continuously-reciprocating movement, thus causing great loss of power by the friction between the valves and valve-seats. In my engine I obviate this difficulty by arranging the valve to slide upon suitably-constructed ways within the cylinder-head, and by constructing the actuating mechanism so that the valve opens to admit the charge, closes, and remains stationary while there is any pressure within the cylinder.

Another disadvantage in ordinarily-constructed engines is the loss of expansive force sustained by the rapid passage of heat following the explosion into the cylinder-walls and piston. I obviate this in a great measure by projecting from the face of the piston a metallic spiral, the diameter of which is somewhat less than that of the cylinder. This spiral becomes highly heated after a few explosions, and as each new charge is admitted imparts this heat to the mixture, thus raising its temperature, increasing the compression, and accelerating and economizing the expansive force of the explosion.

Another object arrived at in my engine is to produce a mixture that will explode with great suddenness, and I am convinced by experiment that a charge so constituted to explode within the cylinder at certain points along the stroke of the piston will accomplish the best results. To secure the greatest economy of expansive force, I allow a sufficient quantity of the mixture to remain behind the piston to sustain combustion until the charge in the first compartment is ignited.

My engine consists in these and other improvements, all of which will be hereinafter fully described, and pointed out in the claims.

Figure 6:
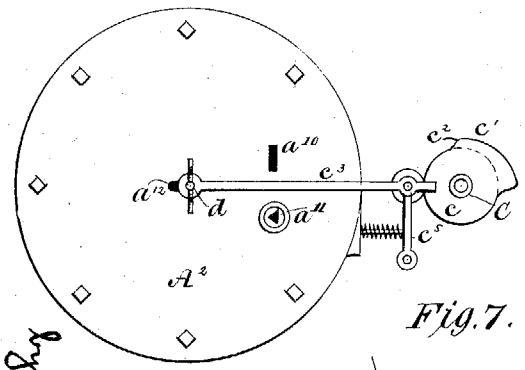
Figure 7:
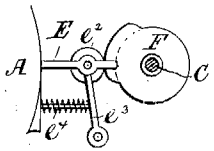

In the drawings, Figure 1 is a horizontal longitudinal section; Fig. 2, an inside elevation of the cylinder-head; Fig. 3, an inside elevation of the face-plate, showing the ports and slide-valve ways; Fig. 4, a plan view of the valve; Fig. 5, a vertical longitudinal section of the cylinder; Fig. 6, an end elevation of the same, showing the slide-valve-actuating mechanism; and Fig. 7 is a detail of the exhaust-valve-actuating mechanism.

The construction of the several parts of my engine may be described as follows:

The cylinder A is provided with a cylinder-head, A′, and face-plate $A^2$. It is of equal bore throughout, and consists of an inner and outer jacket, the intermediate space being filled with water or other non-conducting medium to prevent the inner jacket from becoming overheated by the repeated explosion of the combustible mixture. Depending from the lower side of the cylinder, and arranged at suitable distances along its bore, are auxiliary explosion-chambers *a*. They communicate through both jackets with the interior of the cylinder by ports *a′*, and with each other through ports $a^2$, these latter ports being covered with suitably-protected wire-gauze to prevent premature ignition of the other chambers. Projecting from the side of the chamber next the cylinder-head, passing through the jackets, and entering the cylinder below the lowest point reached by the piston, is a pipe, $a^3$, as shown, the end within the cylinder being protected by gauze-wire to prevent passage of flame to the chambers. I provide, however, that these chambers may be arranged upon the side or top of the cylinder. Placed in the side of the cylinder and next the cylinder-head is the exhaust-port $a^4$. It enters the cylinder below the lowest point reached by the piston, and extends beyond the outer jacket through a suitable thickness of metal, and may be connected with a pipe (not shown) for carrying away the products of combustion. This port is closed by a valve, the construction and operation of which will be hereinafter fully set forth.

The cylinder-head A′ is bolted to the end of the cylinder, and is provided with a central opening equal in size with the bore of the cylinder, and forms a continuation thereof, as shown. Projecting horizontally from the edges of the head is a rim, $a^5$, and extending horizontally across the head, above and below the central opening, are ribs $a^6$. Another rib, $a^7$, extends vertically between the ribs $A^6$ to the left hand of the opening, and slightly separated from it, thus forming water-spaces, filled through the hole $a^8$ from the cylinder-space upon three sides of the opening. The rim is thickened on the right-hand side between the ribs $a^6$, so that a suitable recess is formed around the central opening, in which are located the slide-valve and its ways. Through this thickened portion pass the wires which transmit the spark to the charge. It will also be seen that the ribs are of equal width with the rim, so that the face-plate will bolt tightly against the cylinder-head.

The face-plate $A^2$ is of equal diameter with the cylinder-head, and is bolted tightly against it. Upon the inner side of the plate are placed the horizontal slide-valve ways $a^9$, of equal length with the recess in the cylinder-head, which they enter when the parts are bolted together, as shown in Fig. 5. Cut through the plate somewhat to the right hand of the center are the air and gas ports. The air-port $a^{10}$ is shown rectangular in outline, and is arranged above and upon the same vertical line with the triangular gas-port $a^{11}$. The area of the gas-port is considerably less than that of the air-port, and may be arranged above it or beside it, if so desired. Also, cut through the plate at about its central point is the horizontal slot $a^{12}$, in which travels the slide-valve-actuating pin, as shown.

B is the piston, and is preferably made the shape shown in the drawings, so that a long bearing-surface may be had upon the walls of the cylinder. It is provided with suitable packing-rings and with piston-rod, as shown. Secured by one end to the face of the piston, and carried around its circumference near the walls of the cylinder, is the coil $b$, the functions of which will be hereinafter fully set forth. Pivoted to the end of the piston is a rod, 1, which connects it with the crank-shaft 2. Situated upon this shaft is the fly-wheel 3 and a small bevel-gear, 4.

C is the shaft, upon which is placed the valve actuating cam. It is at right angles to the shaft 2, and has placed upon its end next said shaft a bevel-gear, 5, twice the diameter of and meshing with the gear 4, as shown, the object of this being to cause the cam-shaft to revolve once while the main shaft revolves twice. These shafts are journaled in suitable bearings in a bed-plate. (Not shown.) The rear end of the cam-shaft, however, is further braced by running through a bracket, 6, projecting from the cylinder-head.

I will now proceed to describe the slide and and exhaust valves and their connections with the actuating-cams on the cam-shaft.

D is the slide-valve, and is preferably made flat, its length being somewhat greater than its width, and the ends being beveled, if so desired. It slides between the ways $a^9$ of the face-plate, and with them enters the recess around the central opening of the cylinder-head when the parts are in position. It is provided with a pin, $d$, which projects through the slot $a^{12}$, and affords means of connection for the valve-actuating rod. The air-port $d'$ is the same shape and size as the port $a^{10}$, and registers with it in the operations of the valve. The gas-port $d^2$ is of the same shape and size and registers with the port $a^{11}$. The ports, however, are so arranged that the air-port is given a slight lead on the gas-port, and consequently permits pure air to enter the cylinder before the admission of the air and gas. This relative position of the ports is clearly shown in Figs. 3 and 4 of the drawings. A spring is secured to the pin $d$ and rested upon the face-plate, as shown in Figs. 5 and 6, to hold the valve to its seat.

$c$ is the cam-wheel for actuating the slide-valve, and is secured upon the end of the cam-shaft on a line with the projecting portion of the valve-pin. Formed on the periphery of the wheel is a cam, $c'$. The ascent from the level of the wheel to the commencement of the cam proper, which point, for convenience of description, I letter $c^2$, is gradual, so that the parts will work smoothly. From the point $c^2$ the cam increases in height to the point where it descends to the level of the wheel, the object of this construction being to cause an acceleration in the travel of the valve. The pitman $c^3$ transmits the motion from the cam to the valve. One end is pivoted to the valve-pin, and the other is formed in two prongs or forks, $c^4$, which embrace the wheel, and have journaled between them a roller arranged to travel on the periphery of said wheel, as shown. The pitman is supported on a rocker arm, $c^5$, and the roller is held against the cam-wheel by a spiral or other suitable spring which presses between the rocker-shaft and side of the cylinder.

E is the exhaust-valve rod, having formed on its inner end the valve $e$, which fits and closes the exhaust-port $a^4$. The valve-rod passes through a suitable aperture in the cylinder, and its outer end is formed with prongs or forks $e'$, which embrace the cam-wheel, and have journaled between them the roller $e^2$, which travels on the periphery of the wheel. The rod is supported by a rocker-arm, $e^3$, and the roller is held against the periphery of the cam-wheel by the spring $e^4$, as shown. The exhaust cam-wheel F, against which the exhaust-rod rests, is secured to the cam-shaft on a line with said rod, and is formed with a suitable cam, $f$, to open the exhaust-valve.

$g$ $g'$ represent the battery-wires; $g^2$, an induction-coil.

$g^3$ and $g^4$ represent wires extending from the coil $g^2$ down into the recess in the cylinder-head, they being properly insulated in their passage through the metal by a suitable non-conductor, $g^5$, and their ends within the cylinder being arranged a short distance apart, so that a spark will pass between them in the operation of the invention. One of the wires $g$ $g'$ (preferably the wire $g'$) is broken, its broken ends being normally apart and arranged to be brought in contact by an arm, $g^6$, as it is carried around by the revolution of the shaft C, thus closing the circuit and causing the spark to pass between the ends of the wires $g^3$ $g^4$, exploding the charge.

In order to carry out fully the objects arrived at in the construction of my engine, it is necessary that the several detached portions of the charge should explode with extreme suddenness, and to accomplish this object I constitute a charge in which the proportions of air and gas are such as will produce this result. I produce this charge and introduce it into the cylinder as follows: It is set forth and shown in the drawings that while the air and gas ports in the face-plate are upon the same vertical line the corresponding ports in the valve are not, the air-port being placed slightly ahead of the gas-port. It it also seen that the construction of the cam $c$ imparts to the valve a constantly-accelerating motion. As the cam turns around against the pitman the roller journaled therein commences to ascend the incline toward the point $c^2$, and when near this point in the ascent the valve will have moved sufficiently to open the air-port a short distance and permit pure air to enter the cylinder while the gas-port is still closed. When the roller reaches the point $c^2$ the valve will have traveled far enough to slightly open the gas-port, and gas will also commence to enter. Now, as the roller travels along the heightened face of the cam the movement of the valve is accelerated, the gas-port opened wider, the proportion of gas increased, and when the roller approaches the highest portion of the cam the air-port will have passed its wide-open point and its area commences to diminish, the gas-port area still being on the increase. The result is that, although a preponderance of air was admitted at the beginning of the stroke, the proper proportions to produce a quickly-combustible mixture will have been secured when the stroke is completed and the valve closed. The advantages secured by this construction and operation of the valve are that the pure air first admitted drives forward against the piston any sparks which remain around the port from previous explosion, and thereby prevents premature explosions of the incoming charge. I have found by experiment that the constant increase in the strength of the charge caused by the lead on the air-port and the acceleration in the speed of the valve enable me to take the charge quickly and mix it thoroughly in the cylinder. I wish to state, however, that after the charge has entered the cylinder and the valve closed the proportion of air and gas is such as to produce a highly-explosive mixture, this proportion being about one part of gas to twelve parts of air. It will be further seen that by the construction and operation of the valve exact proportions of air and gas are admitted to form the highly-explosive charge, thus dispensing with a gas-valve or governor for that purpose. The valve-actuating cam is so arranged upon the shaft that the valve does not commence to move until the exhaust-port is opened and the products of combustion from the cylinder are nearly exhausted, and to render the operation of the parts complete the cam-wheel of the exhaust is arranged to open the port just as the piston commences its instroke, and hold it open until the slide-valve is ready to admit the charges.

I am aware that in some gas-engines a charge of air is first admitted, and then a charge of air and gas, the purpose alleged being to cushion the piston and cause gradual combustion; but in my engine I wish to obtain a quick pressure on the piston and also to avoid gradual combustion. The air first drawn in is to clear away the sparks, and the subsequent strong charge of air and gas to produce the proper proportions for a rapidly-combustible mixture.

Now, in order to more clearly describe the operation and functions of the several parts in igniting and in the stroke, suppose the piston to be at the end of its instroke. (Indicated by the dotted piston, Fig. 5.) Just before this point has been reached the cam on the wheel $c$ has caused the valve to move, so that the air-port is ready to open the moment the piston starts on its outstroke. As the piston proceeds the ports open wider and faster, and the proportions of air and gas are admitted as hereinbefore set forth. When the piston reaches the outstroke the full charge will be contained within the cylinder, and the cam will have turned off the pitman-roller, and the rocker-shaft spring will immediately close it. As the piston returns the charge is forced through the auxiliary-chamber ports and the compression-tube into the chambers, enough of the charge remaining behind the piston, however, to support combustion until the inner chamber in reached. As the crank passes the inner dead-point and as the piston starts on its outstroke a spark passes between the wires and the charge behind the piston is ignited. As the piston proceeds outwardly and opens the port of the inner chamber the charge therein immediately explodes into the cylinder, and expands against the piston when the crank has reached a point in its stroke where the force can be exerted to advantage. The remaining chambers explode in turn as the piston clears the ports, thus keeping up the pressure throughout the stroke. When the piston has reached the outstroke the exhaust-cam opens the port, and as the piston returns the products of combustion in the cylinder and auxiliary chambers pass out of the exhaust until the pressure within the cylinder and chambers has been reduced to atmospheric pressure. The same operation is then repeated. It will be seen that the piston also acts as a valve to open and close the auxiliary chamber-ports. After the first few explosions have taken place the heat generated thereby will be in a measure imparted to the spiral on the piston, so that each incoming charge will be heated and expanded, and thus a greater degree of compression produced. The spiral also acts to more thoroughly intermingle the particles of air and gas.

The principal features of economy in this engine are its simplicity of construction and operation, the increased force secured from the same quantity of explosive mixture by distributing it along the cylinder and igniting it behind the piston at points along the stroke where great leverage is had upon the crank, the employment of a spiral or coil to expand the charge as it is drawn in, thus producing greater compression and quicker combustion, and the construction and arrangement of the valve, whereby the charge is drawn in quickly and in proper proportions.

What I claim as my invention, and desire to secure by Letters Patent, is—

1. The method of operating a gas-engine which consists in propelling the piston by successive explosions during each power-stroke, substantially as set forth.

2. The method of operating a gas-engine which consists in admitting into the cylinder a combustible charge, forcing the same into separate compartments, and exploding it in detail behind the piston as it makes its power-stroke, as set forth.

3. The method of operating a gas-engine which consists in drawing a charge into the cylinder, forcing it into separate compartments, and exploding it in detail behind the piston as it makes the power-stroke, as set forth.

4. The method of operating gas-engines which consists in drawing into the cylinder by the outstroke of the piston a properly-proportioned charge of inflammable mixture, forcing it into the auxiliary chambers by the return-stroke, and then exploding the charge in succession upon the power-stroke of the piston, substantially as set forth.

5. The method of operating gas-engines which consists in drawing into the working cylinder upon the outstroke of the piston a charge of air and gas, compressing it in auxiliary explosion-chambers located in the path of the piston and communicating with the cylinder by the return-stroke of the piston, exploding the charges in succession upon the power-stroke of the piston, and finally expelling the consumed charge or charges by the subsequent return-stroke, substantially as set forth.

6. The method of operating gas-engines which consists in first admitting a charge of pure air, which is followed by a charge of air and gas admitted through ports of different areas, the latter being in excess of the former during the remainder of the charge, substantially as set forth.

7. A gas-engine cylinder provided with one or more supplemental explosion-chambers, as set forth.

8. A gas-engine cylinder having attached to it a series of chambers which communicate with the bore thereof through suitable apertures, each chamber being adapted to receive a portion of the charge and to permit its successive explosion at stated points in each power-stroke of the piston, as set forth.

9. A gas-engine cylinder having attached to it a series of chambers which communicate with the bore thereof through suitable apertures, and with each other through suitably-protected ports, each chamber being adapted to receive a portion of the charge and to secure an equable pressure in all through the intermediate ports, as set forth.

10. A gas-engine cylinder having attached to it a chamber or series of chambers which communicate with the bore thereof through suitable apertures controlled by the piston in its travel, each chamber being adapted to receive a portion of the charge and to permit its successive explosion at stated points in each power-stroke of the piston, as set forth.

11. A gas-engine cylinder having attached to it a series of chambers communicating with the bore thereof through suitable apertures controlled by the piston in its travel, and with each other through suitably-protected ports, each chamber being adapted to receive a portion of the charge and to secure an equable pressure in all through the intermediate ports, as set forth.

12. A gas-engine cylinder having attached to it a chamber or series of chambers communicating with the bore thereof through suitable apertures, with each other through intermediate ports, and also communicating with the cylinder through a compression-tube, which enters said cylinder below the inmost point reached by the piston, whereby the proper proportion of the charge is forced into the chambers after the piston has closed the chamber-ports, as shown and described.

13. The combination, in a gas-engine, of the cylinder provided with an auxiliary chamber or a series of chambers, each having a port, opening into the cylinder, and the inmost chamber having a compression-tube opening into the cylinder below the lowest point reached by the piston, with the piston, adapted to force the charge into the chambers, close the ports, and complete the operation through the compression-tube, substantially as shown and described.

14. In a gas-engine, the cylinder-head A′, having a central opening, suitably-constructed water-spaces, a recess for the reception of the slide-valve, and its ways, said cylinder-head being adapted to be bolted to the end of the cylinder, substantially as shown and described.

15. The face-plate $A^2$, having ways upon its inner face for the slide-valve to slide between, suitably-arranged air and gas ports, and a slot for the passage of the valve-actuating pin, said plate being adapted to bolt onto the cylinder-head, as shown and described.

16. The combination, in a gas-engine, of the cylinder A, the cylinder-head A′, constructed as shown, and the face-plate $A^2$, arranged substantially as shown and described.

17. The slide-valve D, operating between suitably-arranged ways upon the inner side of the face-plate, and having air and gas ports adapted to register with the ports in the face-plate, in combination with the valve-actuating mechanism, said mechanism being adapted to impart an intermittent motion to the valve, substantially as and for the purposes set forth.

18. The slide-valve D, operating between suitably-arranged ways upon the inner side of the face-plate, and having formed through it an air-port and gas-port, the said air-port being placed in advance of the gas-port, whereby in the operation of the valve air is first admitted into the cylinder, and then a mixture of air and gas, in which the proportion of gas increases to the end of the stroke, said valve being in combination with its actuating mechanism, as set forth.

19. The slide-valve D, operating between suitably-arranged ways upon the inner side of the face-plate, and having formed through it an air-port and a gas-port, the air-port being placed in advance of the gas-port, whereby pure air is first admitted into the cylinder, and then a charge of air and gas, the ports being arranged so that after the entire charge has been admitted the proportions will be such as to produce a rapidly-combustible mixture—say about one part gas to twelve parts air—as set forth.

20. The combination, in a gas-engine, of the cylinder A, its cylinder-head and face-plate, the cylinder being provided with suitably-constructed auxiliary chambers, the slide-valve, and its actuating mechanism, all arranged to operate substantially as set forth.

21. The combination, with a gas-engine having a valve provided with ports of different areas, of the slide-valve-actuating cam, secured upon a properly-arranged cam-shaft, said cam being made increasing in height its entire length, whereby an accelerating motion is transmitted to the said valve, and mechanism for connecting the cam and valve, as set forth.

22. The combination, in a gas-engine, of the cam $c$, the pitman $c^3$, its roller, rocker-shaft, and spring, and the slide-valve D, all arranged to operate as set forth.

23. The combination, with a gas-engine, of a cam adapted to open the slide-valve to admit a charge, close it, and hold it stationary while the charge is compressed, exploded, and the products are expelled, substantially as set forth.

24. In a gas-engine, the piston having projected from its face a metallic coil, substantially as and for the purpose set forth.

25. The combination, with the piston, the crank-shaft, and cam-shaft, having the cams F and c, constructed and arranged as shown, of the slide and exhaust valves, connected with their respective cams by suitably-constructed mechanism, all arranged to operate substantially as shown and described.

26. In a gas-engine, the combination, substantially as specified, of the cylinder, coil $g^2$, wires $g^3$ $g^4$, and battery-wires $g$ $g'$, the shaft C, and arm $g^6$, extended from the shaft and arranged to engage the wires $g'$ and complete the circuit, and means for revolving the shaft, as set forth.

In testimony whereof I affix my signature in presence of two witnesses.

LEWIS C. PARKER.

Witnesses:
R. W. VAN PELT,
W. A. DRINKWATER.